United States Patent

Tada et al.

[11] Patent Number: 5,832,476
[45] Date of Patent: Nov. 3, 1998

[54] DOCUMENT SEARCHING METHOD USING FORWARD AND BACKWARD CITATION TABLES

[75] Inventors: Katsumi Tada, Yokohama; Kanji Kato, Tokorozawa; Satoshi Asakawa, Ebina; Akio Azuma, Kashiwa, all of Japan

[73] Assignee: Hitachi, Ltd., Tokyo, Japan

[21] Appl. No.: 746,905

[22] Filed: Nov. 19, 1996

Related U.S. Application Data

[63] Continuation-in-part of Ser. No. 495,232, Jun. 27, 1995, Pat. No. 5,745,745.

[30] Foreign Application Priority Data

Jun. 29, 1994 [JP] Japan ................................ 6-147399
Nov. 17, 1994 [JP] Japan ................................ 6-308201
Nov. 21, 1995 [JP] Japan ................................ 7-302463

[51] Int. Cl.[6] ................................ G06F 17/30
[52] U.S. Cl. ................................ 707/2; 707/102
[58] Field of Search ................................ 707/2, 4, 102

[56] References Cited

U.S. PATENT DOCUMENTS

| | | | |
|---|---|---|---|
| 5,097,418 | 3/1992 | Nurse et al. | 707/537 |
| 5,157,783 | 10/1992 | Anderson et al. | 707/4 |
| 5,418,948 | 5/1995 | Turtle | 707/4 |
| 5,444,615 | 8/1995 | Bennett et al. | 364/401 |
| 5,544,352 | 8/1996 | Egger | 707/5 |
| 5,594,897 | 1/1997 | Goffman | 707/102 |
| 5,623,681 | 4/1997 | Rivette et al. | 707/522 |
| 5,649,192 | 7/1997 | Stucky | 707/103 |
| 5,708,825 | 1/1998 | Sotomayor | 395/762 |
| 5,745,745 | 4/1998 | Tada et al. | 707/1 |

*Primary Examiner*—Wayne Amsbury
*Attorney, Agent, or Firm*—Fay,Sharpe, Beall, Fagan, Minnich & McKee

[57] ABSTRACT

A document searching system searches for other documents having a user-specified document cited therein as its referred document to thereby uncover the latest document associated with the user-specified document. In related document searching method, document information is registered in a text storage region, a referred document table and a related document table are created, and referred documents associated with the user-specified document are searched for with use of the created tables.

13 Claims, 11 Drawing Sheets

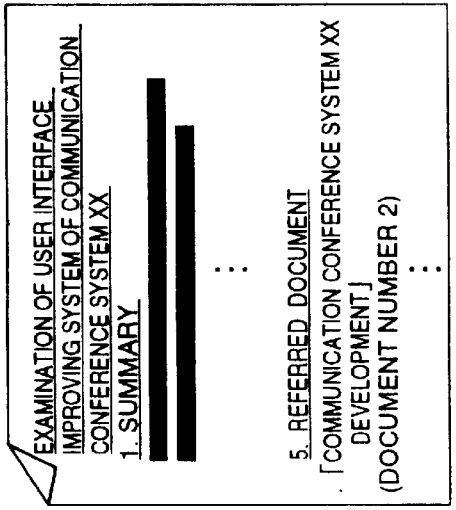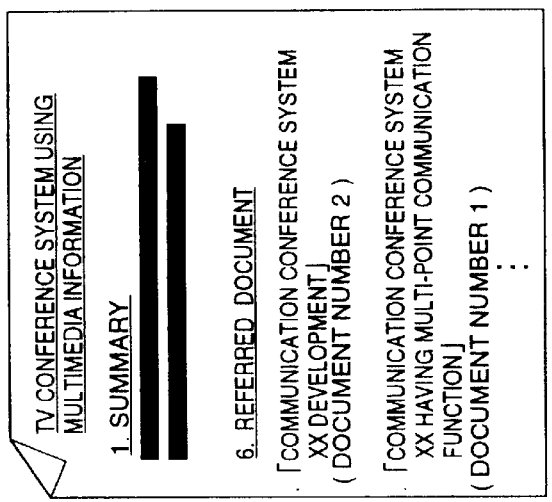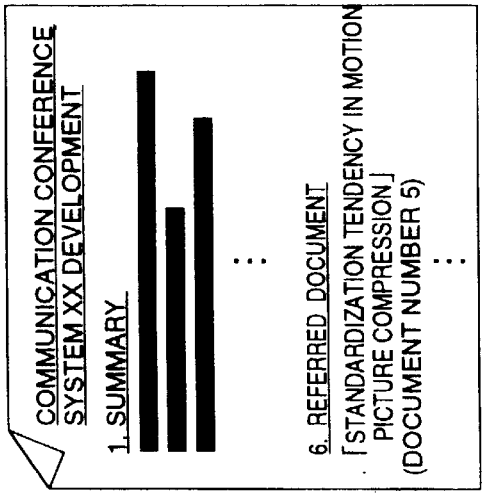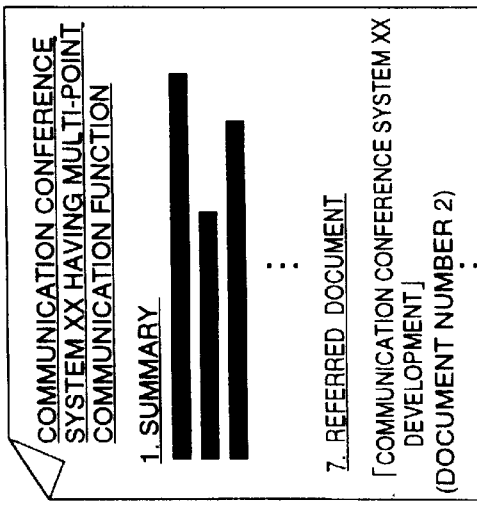
FIG. 3

FIG. 7

```
START
  ↓
READ OUT TEXT DATA OF REGISTRATION DOCUMENT
FROM FLOPPY DISK AND PLACE IT IN WORK AREA      ~1100
OF MAIN MEMORY
  ↓
STORE TEXT DATA PLACED IN WORK AREA INTO
TEXT STORAGE REGION OF MAGNETIC                 ~1101
DISK AS IT IS
  ↓
READ OUT DOCUMENT MANAGEMENT INFORMATION
FROM MAGNETIC DISK AND PLACE IT IN WORK         ~1102
AREA OF MAIN MEMORY
  ↓
ENTER TITLE OF REGISTRATION                     ~1103
DOCUMENT VIA KEYBOARD
  ↓
REGISTER DOCUMENT NUMBER OF REGISTRATION
DOCUMENT AS WELL AS FILE NAME AND TITLE OF
REGISTRATION DOCUMENT IN DOCUMENT               ~1104
MANAGEMENT INFORMATION
  ↓
STORE DOCUMENT MANAGEMENT INFORMATION IN
DOCUMENT MANAGEMENT INFORMATION STORAGE         ~1105
REGION OF MAGNETIC DISK
  ↓
END
```

FIG. 8

| DOCUMENT NUMBER | FILE NAME | TITLE |
|---|---|---|
| 1 | FILE 1. DOC | COMMUNICATION CONFERENCE SYSTEM XX HAVING MULTI-POINT COMMUNICATION FUNCTION |
| 2 | FILE 2. DOC | COMMUNICATION CONFERENCE SYSTEM XX DEVELOPMENT |
| 3 | FILE 3. DOC | EXAMINATION OF USER INTERFACE IMPROVING SYSTEM OF COMMUNICATION CONFERENCE SYSTEM XX |
| 4 | FILE 4. DOC | TV CONFERENCE SYSTEM USING MULTIMEDIA INFORMATION |
| 5 | FILE 5. DOC | STANDARDIZATION TENDENCY IN MOTION PICTURE COMPRESSION |
| ⋮ | ⋮ | ⋮ |

DOCUMENT SEARCHING METHOD USING FORWARD AND BACKWARD CITATION TABLES

CROSS REFERENCE TO RELATED APPLICATION

This is a continuation-in-part of U.S. patent application Ser. No. 08/495232, filed on Jun. 27, 1995, now U.S. Pat. No. 5,745,745 and assigned to the present assignee. The content of that application is incorporated herein by reference.

BACKGROUND OF THE INVENTION

The present invention relates to a method and system for searching a document database for a document or documents very closely associated with a document specified by a user, which can be applied, in particular, to databases, document management systems, document filing systems, electronic library systems and the like.

When it is desired for a reader to inspect a technique of interest in such a technical document as a technical paper after reading it, there has conventionally been used a method that sequentially consults indirectly reference literatures cited in the paper. In this method, as shown in FIG. 2, the system searches a document 1 as an original citation source of referred documents 1 and 2 cited therein to read their contents. If these searched documents alone are insufficient, then the system further examines referred documents a and b contained in these referred documents 1 and 2. The system repeats this procedure of sequentially consulting such referred document indirectly until it finds a desired one.

However, in the aforementioned method for sequentially consulting referred documents indirectly, it is impossible to find a document newer than the first-cited document. This is because the first-cited referred document is older than the original document. In this way, the prior art method has a problem in that it cannot find the latest reference document.

This will be explained more in detail in connection with an example shown in FIG. 2. The referred documents 1 and 2 in the original document 1 are older than the original document. Documents a and b in the referred document 1 are older than the referred document 1. In this way, since documents obtained through the repetitive indirect consultation are sequentially older, it is disadvantageously impossible to obtain a document newer than the original document, that is, the latest document.

It is therefore an object of the present invention to provide a method and system for enabling acquisition of a reference document (especially, the latest one) newer than referred documents cited in an objective document.

SUMMARY OF THE INVENTION

In order to attain the above object, the present invention has an arrangement which follows. That is, in accordance with an aspect of the present invention, there is provided a document searching method for searching a plurality of registered registration documents for a desired one thereof, which method comprises the steps of searching the plurality of registration documents for a referred document in a specified document with use of previously-prepared first link information linking the registration documents to reference documents cited in the registration documents, and searching the plurality of registration documents for one of the registration documents associated with the searched referred document with use of previously-prepared second link information linking other registration documents referring to the objective document to the registration documents.

In accordance with another aspect of the present invention, there is provided a document registering method for registering documents in a document database, which method comprises the steps of creating first link information indicative of registered registration documents linked to referred documents cited in the registration documents, creating second link information indicative of other registration documents referring to the registration documents linked to the registration documents, and registering the first and second link information.

In the document searching method, other documents having a user-specified document cited as their referred documents therein can be searched for. In general, such referred documents often include documents typical of various fields, and the latest document is likely to cite such an identical old document as its referred document. Thus, the latest documents highly closely associated with the user-specified document can be searched for with use of the referred document as a search key.

A summary of the present invention will be detailed in connection with a specific example shown in FIG. 3.

Documents having document numbers 1, 2, 3 and 4 are registered as registration documents of a text data type.

The system then creates and registers a reference document table wherein reference literature (referred documents) cited respectively in the registration documents are registered by numbers thereof. In other words, in the example of FIG. 3, since the document 2 is referred to as a referred document in the document 1, the system generates a link to the referred document from the document 1 to the document 2. Similarly, since a document 5 is referred to as a referred document in the document 2, the system generates a link to the referred document from the document 2 to the document 5. When repeating a similar operation even for the documents 3 and 4, the system generates such links to referred documents as shown in FIG. 4. On the basis of the referred document link information, the system creates a referred document table wherein numbers of referred documents cited in the respective registration documents are registered.

The system further creates and registers a related document table registering therein links from the registration documents to reference originator documents in the form of document numbers. In FIG. 4 for example, the system looks up the registration destination link information backwardly. That is, the system replaces reference originator entries by reference destination entries in the reference destination link information and sorts its replaced result according to the reference destination document numbers to thereby generate the reference originator link information from the reference destination documents to the reference originator documents. On the basis of the reference originator link information, the system creates the related document table showing the links from the registration documents to reference originator documents in the form of their document numbers. The operation of the system in its registration mode has been explained above.

Explanation will now be made as to the operation of the system in its search mode. That is, the system refers to the referred document table with regard to a document specified by a user in a referred document extraction step to thereby obtain the number of a referred document cited in the user-specified document. More specifically, in the case of an example shown in FIG. 5, for example, the system refers to the referred document table with regard to a document 1 specified by the user to obtain a document 2 as its referred document.

In a related document extraction step, next, the system refers to the related document table with respect to the referred document obtained in the referred document extraction step to thereby extract documents that are highly closely associated with the user-specified document. That is, in the example of FIG. 5, the system looks up the related document table with respect to the referred document 2 obtained in the referred document extraction step to thereby obtain documents 1, 3 and 4 as the referred documents of the document 2.

In this manner, the present invention can obtain a document that is newer than an original document, which has not been obtained in the prior art method. Thus, the system of the present invention can search for the latest documents that are very closely associated with a specified document.

BRIEF DESCRIPTION OF THE DRAWINGS

FIG. 3 shows registration documents used in an embodiment of the present invention;

FIG. 7 is a flowchart showing processing contents of a text registration program;

FIG. 8 shows an example of document management information in the present invention;

DESCRIPTION OF THE PREFERRED EMBODIMENTS

Figure 1:
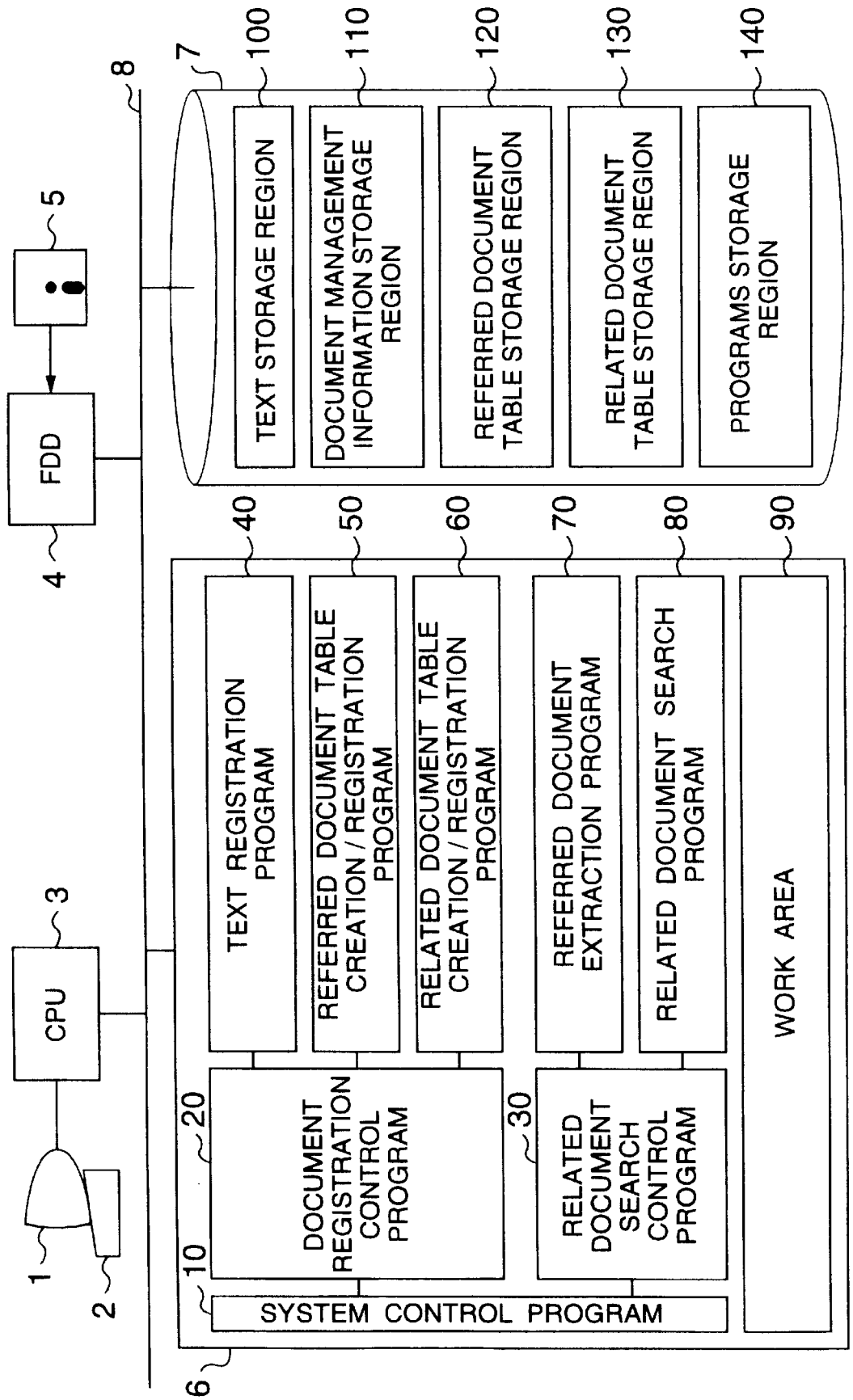
FIG. 1 shows a configuration of a related document searching system in accordance with the present invention.
Figure 2:
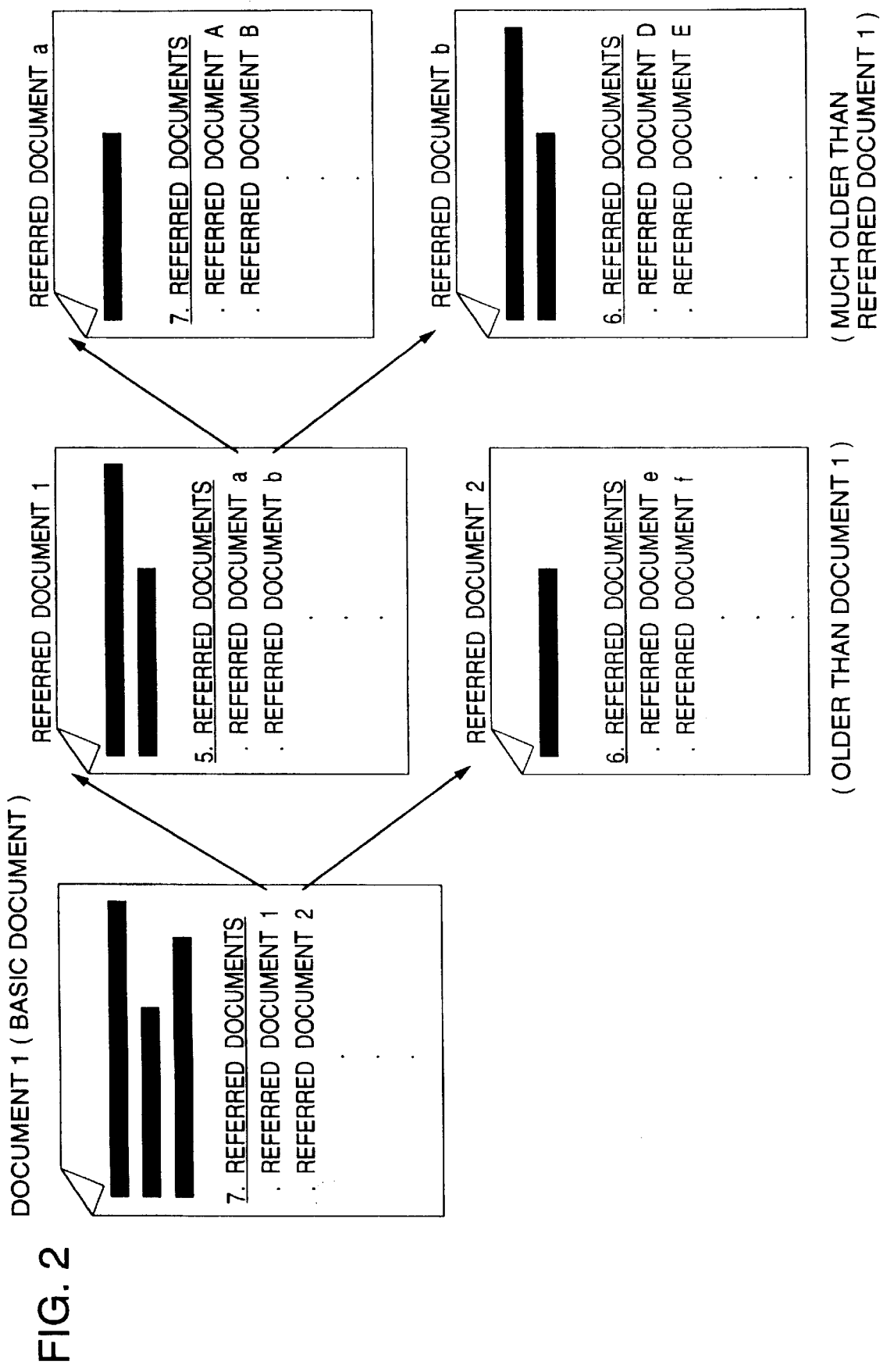
FIG. 2 is a diagram for explaining a prior art related document searching system.

A configuration of a searching system for implementing a document searching method of the present invention is shown in FIG. 1. The searching system illustrated in the drawing includes a display unit 1 for displaying a searched result thereon, a keyboard 2 for a user to enter registration and search commands therethrough, a central processing unit (CPU) 3 for executing registering and searching operations, a floppy disk drive (FDD) 4 for reading out data from a floppy disk inserted therein, a floppy disk 5 for storing therein document data to be registered in a database, a main memory 6 for temporarily storing therein registration and search programs as well as data or the like, a magnetic disk 7 for storing searching data therein, and a bus 8 connected among the above constituent elements.

The main memory 6 has a system control program 10, a document registration control program 20, a related document search control program 30, a text registration program 40, a referred document table creation/registration program 50, a related document table creation/registration program 60, a referred document extraction program 70, and a related document search program 80, these programs being all read out from the magnetic disk 7; and also has a work area 90 reserved therein.

Reserved on the magnetic disk 7 are a text storage region 100, a document management information storage region 110, a referred document table storage region 120, a related document table storage region 130, and a programs storage region 140. In this connection, although these regions have been reserved on the magnetic disk 7 in the present embodiment, these regions may be reserved as necessary on a magneto-optic disk unit or other secondary storage. The configuration of the present searching system has been explained above.

Explanation will next be made as to the operations of the document registration mode and search mode in a document searching method of the present embodiment.

Figure 6:
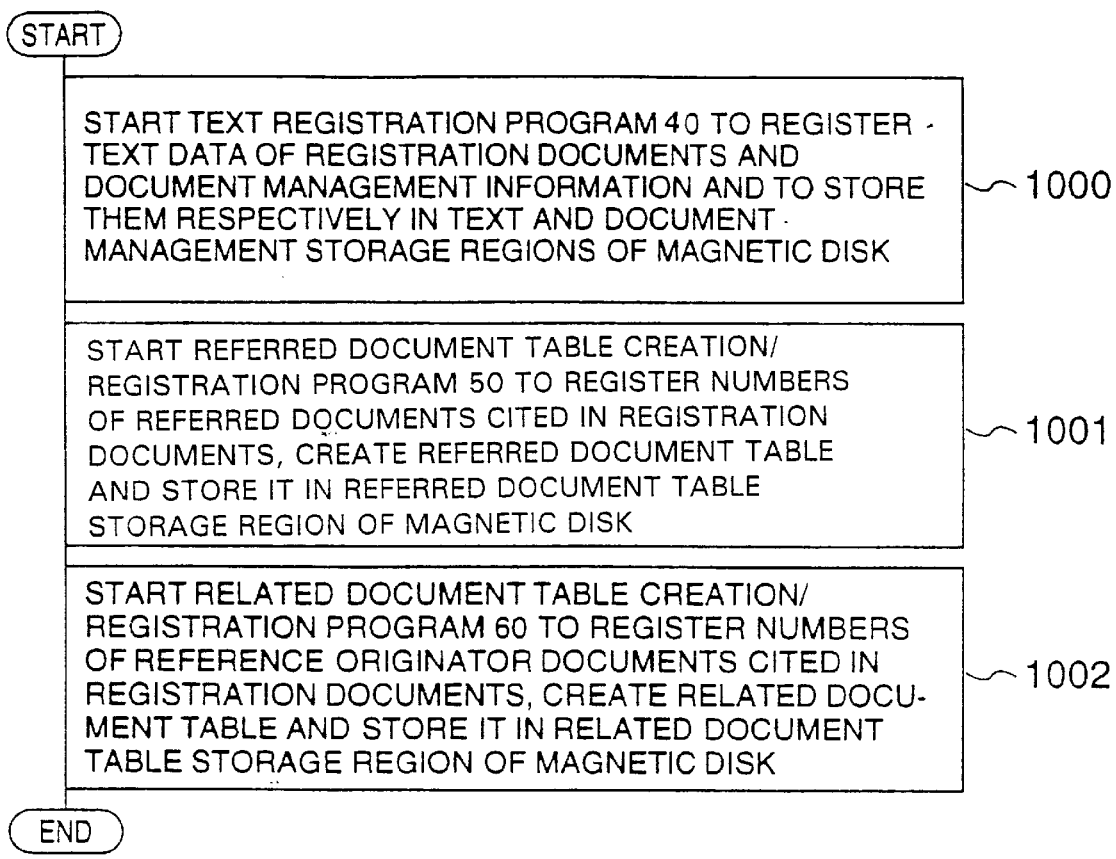
FIG. 6 is a flowchart for explaining a registering procedure in the present invention.

First of all, a registration command entered through the keyboard 2 causes the system control program 10 to activate the document registration control program 20, thus starting the operation of the document registration mode. The operation of the document registration mode will be briefly explained with use of a PAD (Problem Analysis Diagram) chart of FIG. 6.

The document registration control program 20 first starts the text registration program 40 in a step 1000. The text registration program 40 stores the text data of a registration document in the text storage region 100 of the magnetic disk 7, creates document management information on the registration document, and stores the information in the document management information storage region 110 of the magnetic disk.

The document registration control program 20 then starts the referred document table creation/registration program 50 in a step 1001. The program 50 in turn registers the document numbers of referred documents in the respective registration documents to thereby create a referred document table. The referred document table thus created is stored in the referred document table storage region 120 of the magnetic disk 7.

The document registration control program 20 finally starts up the related document table creation/registration program 60 in a step 1002. The program 60 in turn performs the following operations over the respective registration documents. That is, the related document table creation/registration program 60 registers the document number of the reference originator document which cites the registration documents to thereby create the referred document table and store it in the referred document table storage region of the magnetic disk 7. The operation of the registration mode has been briefly explained above.

The processing contents of the aforementioned registration program will next be explained in connection with a case where such documents as shown in FIG. 3 are registered as an example.

The text registration program 40 first reads out the text data of the documents 1, 2, 3, 4 and 5 from the floppy disk 5 inserted into the FDD 4, and then places the read-out text data into the work area 90 (a step 1100 in FIG. 7). In a step 1101, the text registration program 40 then stores the text data placed in the work area 90 into the text storage region 100 of the magnetic disk 7.

Subsequently, in a step 1102, the text registration program 40 reads out document management information from the document management information storage region 110 and puts it into the work area 90 of the main memory 6. In the present embodiment, a correspondence table as shown in FIG. 8 is used as the registration document management information. The program 40 inputs in a step 1103 the titles of the registration documents entered from the keyboard. In a step 1104, the program 40 stores the input titles together with the document numbers of the registration documents and file names with which the registration documents are stored. In this way, the document management information is additionally registered.

After completing the above operations, the text registration program 40 stores the document management information into the document management information storage region 110 of the magnetic disk 7 in a step 1105, at which stage the program 40 terminates the operation of the document registration control program 20.

In this connection, the input of the registration documents is not restricted to the input only from the floppy disk but the input may be allowed from another device via a communication line (not shown in FIG. 1). In the latter case, the input is carried out from a communication controller or the like through the bus 8.

Figure 9:
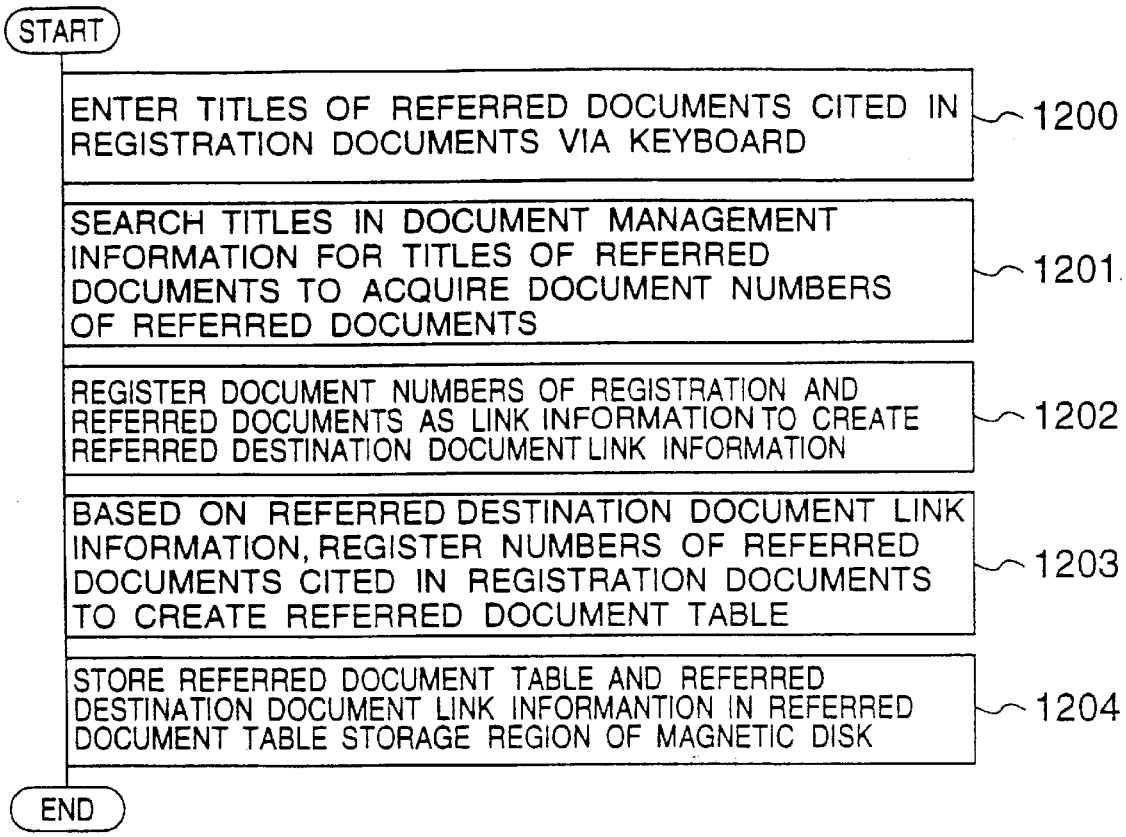
FIG. 9 is a flowchart showing a processing procedure of a referred document table creation/registration program.

As shown in FIG. 9, next, the referred document table creation/registration program 50 first inputs the titles of the referred documents cited within the respective registration documents from the keyboard 2 in a step 1200. With respect to the document with the document number 1 for example, the program 50 inputs "Communication Conference System XX Development" as the document name of the referred document.

In a step 1201, the program 50 searches the titles within the document management information for the titles of the referred documents to thereby acquire the document numbers of the referred documents. That is, with respect to the document having the document number 1, the program 50 searches the titles within the document management information for the "Communication Conference System XX Development" as the title of the referred document to thereby acquire the document number 2 as the document number of the referred document.

In a step 1202, further, the referred document table creation/registration program 50 registers the document numbers of the registration documents and referred document as link information to thereby generate a link to the referred document (which link will sometimes be referred to as the referred destination document link, hereinafter). For example, with regard to the document having the document number 1, the referred document table creation/registration program 50 generates the document number 2 as the referred destination document link.

Figure 4:
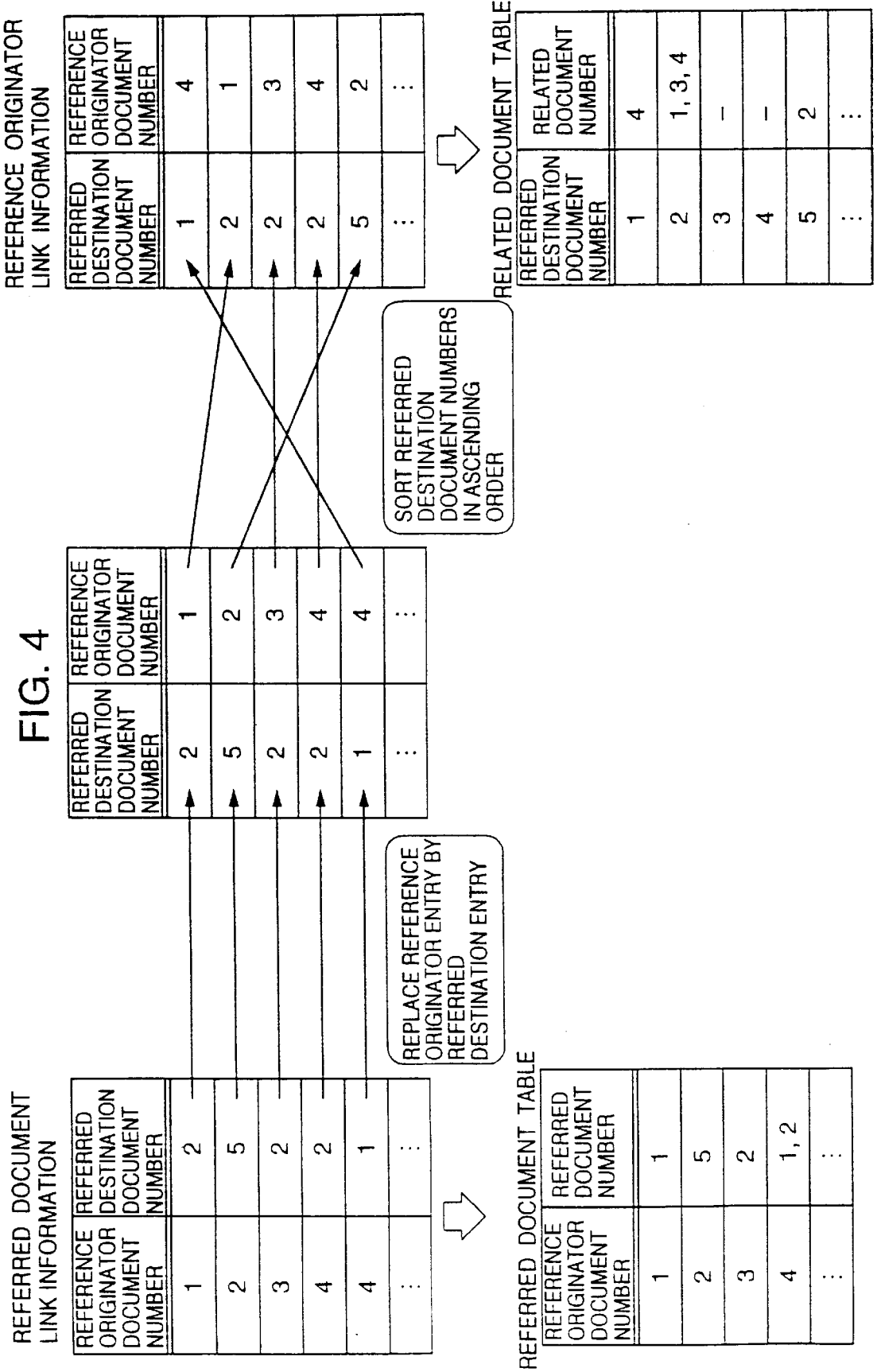
FIG. 4 is an example of how to create a referred document table and a related document table.

In a step 1203, on the basis of the referred destination document link information generated in the step 1202, the referred document table creation/registration program 50 registers the numbers of the referred documents cited in the respective registration documents. This results in that the program 50 creates a referred document table as shown in FIG. 4.

After completing the above operations, the referred document table creation/registration program 50 next performs the following operations. That is, in a step 1204, the program 50 stores the referred document table and referred destination document link information into the referred document table storage region 120 of the magnetic disk 7. In this manner, the program 50 finishes its operation.

Figure 10:
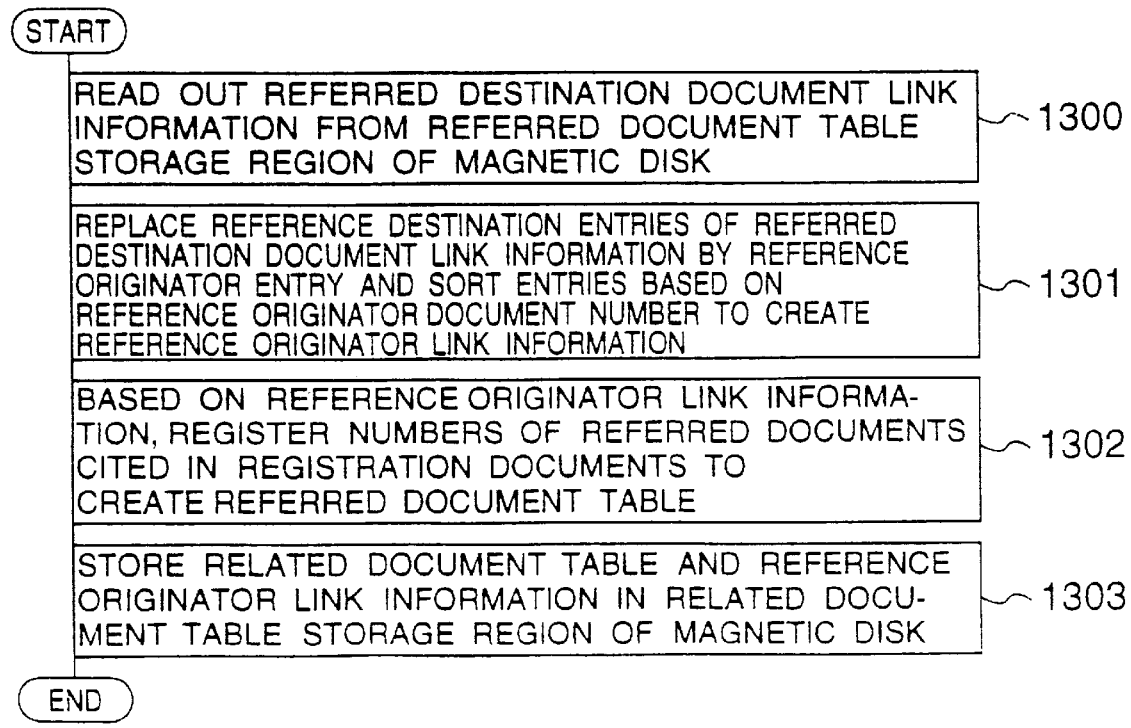
FIG. 10 is a flowchart showing a processing procedure of a related document table creation/registration program.

Finally, the related document table creation/registration program 60 carries out the following operations as shown in FIG. 10. In a step 1300, first of all, the program 60 reads out the referred destination document link information from the referred document table storage region 120 of the magnetic disk 7 and places the information into the work area 90 of the main memory 6.

In a step 1301, the related document table creation/registration program 60 replaces the entry of the referred document destination in the referred destination document link information by the entry of the reference originator. The program 60 further sorts the entries according to the reference originator document number to thereby generate reference originator link information, which is as shown in FIG. 4. Further, the program 60 registers the numbers of the referred documents cited in the respective registration documents on the basis of the reference originator link information to thereby create the referred document table in a step 1302.

After completing the above operations, the related document table creation/registration program 60 stores in a step 1303 the referred document table and the reference originator link information into the related document table storage region 130 of the magnetic disk 7. In this way, the program 60 finishes its operation. The specific processing contents of the operation of the registration mode have been explained above.

Figure 5:
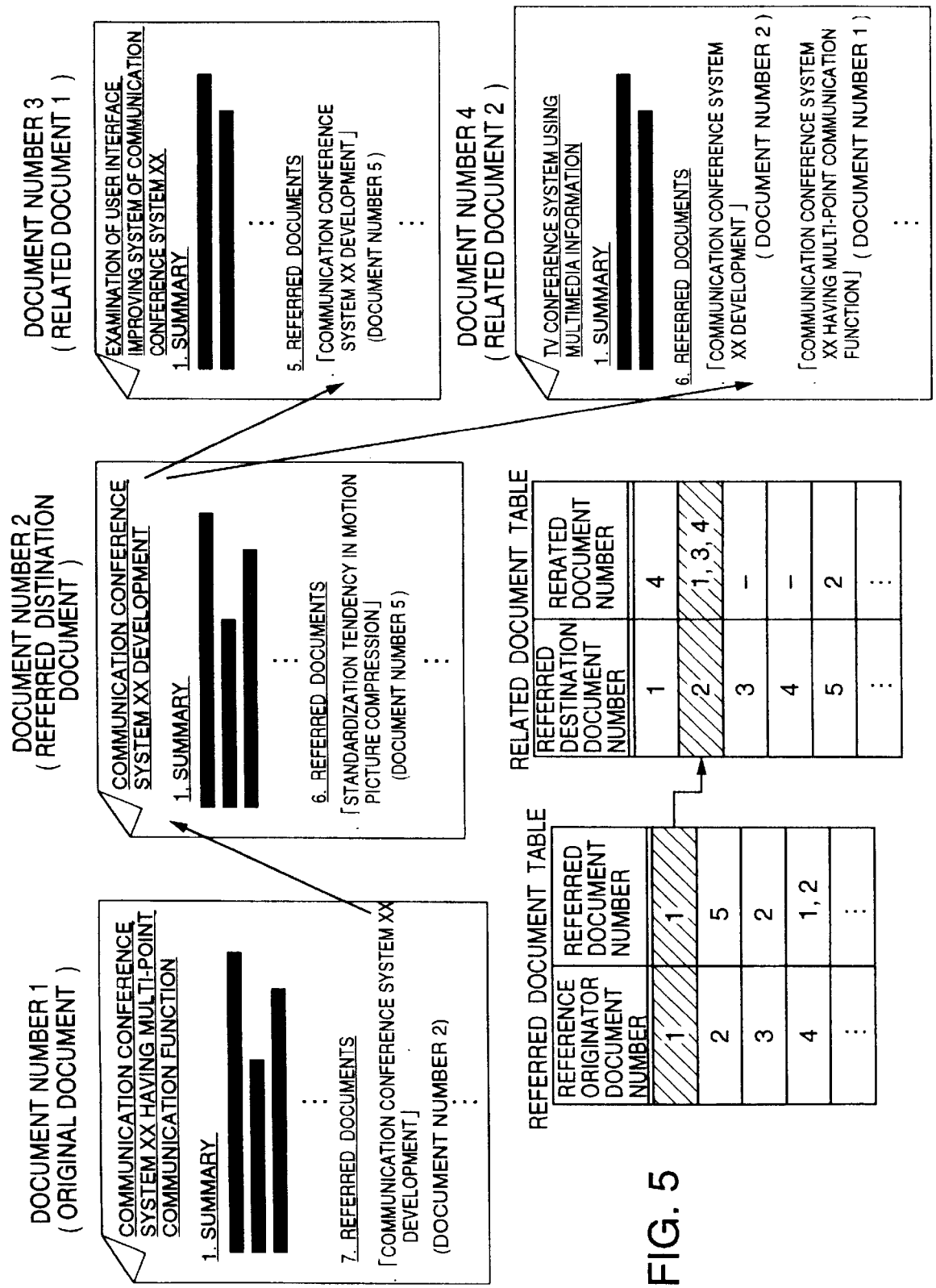
FIG. 5 is an example of how to search related documents in the present invention.
Figure 11:
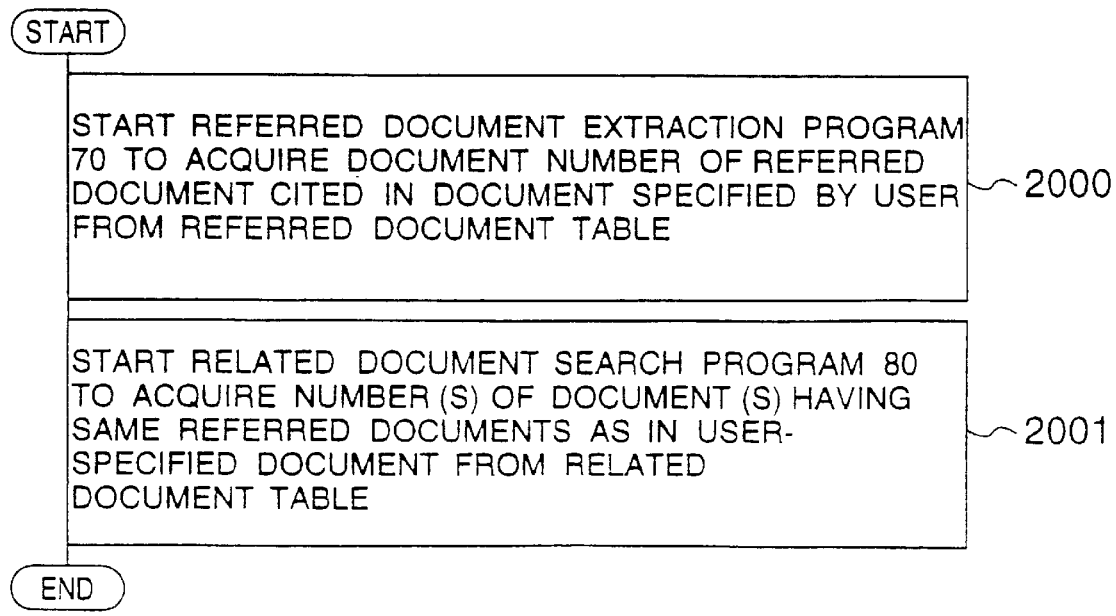
FIG. 11 is a flowchart showing a searching procedure in the present invention.

Shown in FIG. 11 is a procedure of operations in the search mode. The operations of the search mode will be explained in connection with an example in which the system searches the documents shown in FIG. 5 for documents associated with the document number 1.

First, under control of a search command entered from the keyboard 2, the system control program 10 activates the related document search control program 30 to start its referred document searching operation.

The related document search control program 30 then starts the referred document extraction program 70 in a step 2000. The program 70 looks up the referred document table to thereby acquire the document number of the referred document cited in the document specified by the user. More specifically, in the case of the example of FIG. 5, the program 70 looks up the referred document table with respect to the document number 1 specified by he user. This causes the program 70 to obtain the document number 2 as the number of the referred document cited in the document of the document number 1.

The related document search control program 30 next activates in a step 2001 the related document search program 80. The program 80 in turn, on the basis of the document number of the referred document extracted by the referred document extraction program 70, looks up the referred document table. This causes the program 80 to acquire the number of the document referring to the document cited in the user-specified document. More concretely, in the example of FIG. 5, the program 80 looks up the referred document table with respect to the document number 2 acquired as the referred document of the document number 1 specified by the user. This causes the program 80 to acquire the document numbers 1, 3 and 4. Through the above operations, the program 80 can obtain the documents 3 and 4 as documents highly closely associated with the document 1. The specific contents of the operations of the search mode have been explained above.

In the first embodiment of the present invention, explanation has been made in the foregoing as to how the registrant specifies the referred document cited in the document to be registered in the registration mode.

Explanation will next be made as to a second embodiment of the present invention. The second embodiment is directed to a search system which extracts a document cited in a document specified by a user in the search mode and extracts a document containing the title of the thus-extracted referred document in its logical structure to thereby obtain a document very closely associated with the user-specified document.

Figure 12:
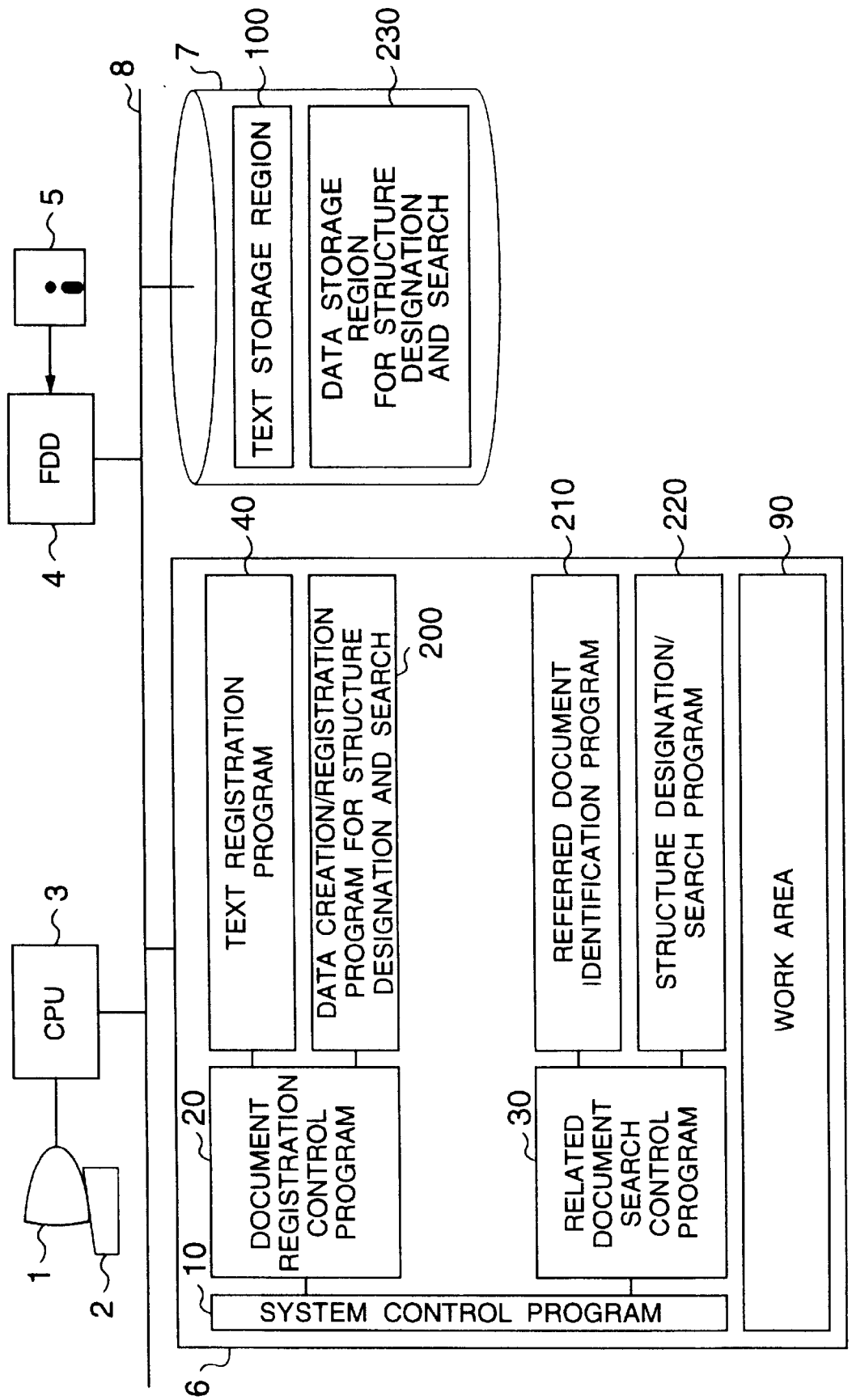
FIG. 12 is a configuration of a second embodiment of the present invention.

FIG. 12 shows a configuration of the second embodiment of the present invention. More in detail, the search system of the present embodiment includes a data creation/registration program 200 for structure designation and search in place of the referred document table creation/registration program 50 and related document table creation/registration program 60 in the search system of the first embodiment of FIG. 1; a referred document identification program 210 in place of the related document search program 80; a structure designation/search program 220 in place of the related document search program 80; and a data storage region 230 for structure designation and search in place of the document management information storage region 110, referred document table storage region 120 and related document table storage region 130. Further, as the data creation/registration program 200, structure designation/search program 220, and data storage region 230, those disclosed in U.S. patent application Ser. No. 08/495232 (JP-A-6-308201) are used herein.

The document searching and registering operations of the present embodiment will be explained below. It is assumed in the present embodiment that documents used therein are described in SGML (Standard Generalized Markup Language). In other words, the logical structure of a referred document in the present embodiment corresponds to a zone surrounded by start tag "<reference>" and end tag "</reference>".

Figure 13:
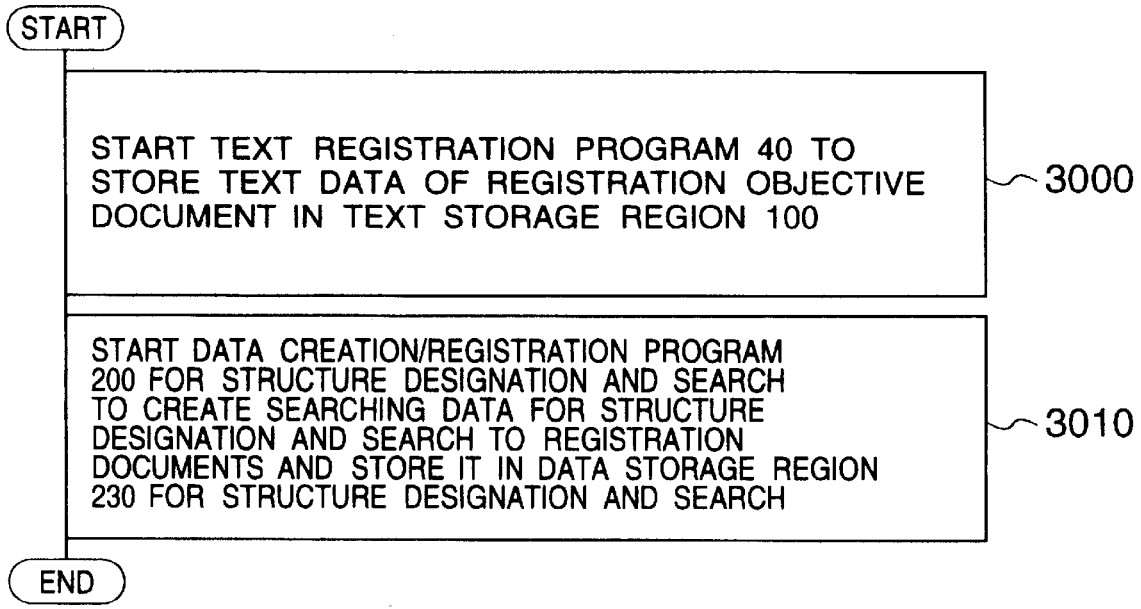
FIG. 13 is a flowchart showing a registering procedure of the second embodiment of the present invention in a registration mode.

The operation of the registration mode will first be explained with use of a PAD diagram of FIG. 13. The document registration control program 20 activates the text registration program 40 in a step 3000 to cause the text data of a registration document to be stored into the text storage region 100 of the magnetic disk 7.

The document registration control program 20, in a step 3010, then activates the data creation/registration program 200 for structure designation and search to create, e.g., data for such structure designation and search as to search a document containing a searching term in the logical structure of a referred document, and to store the created data in the data storage region 230 for the structure designation and search. The operation of the registration mode has been briefly explained above.

Figure 14:
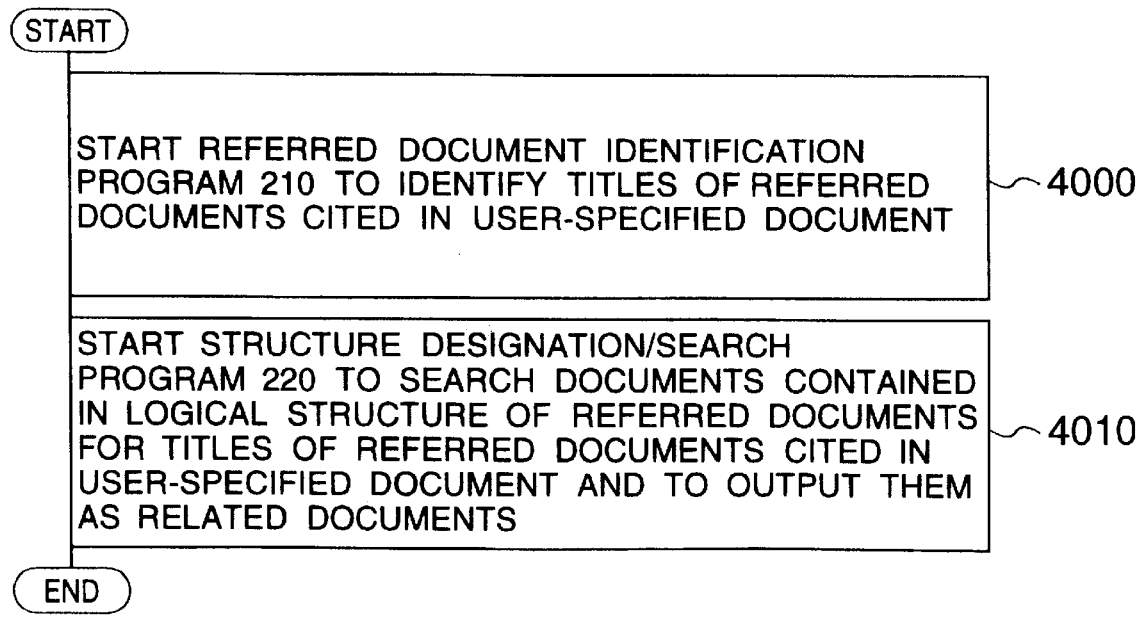
FIG. 14 is a flowchart showing a searching procedure of the second embodiment of the present invention in a search mode.

The operation of the search mode will next be explained with use of a PAD diagram shown in FIG. 14.

Figure 15:
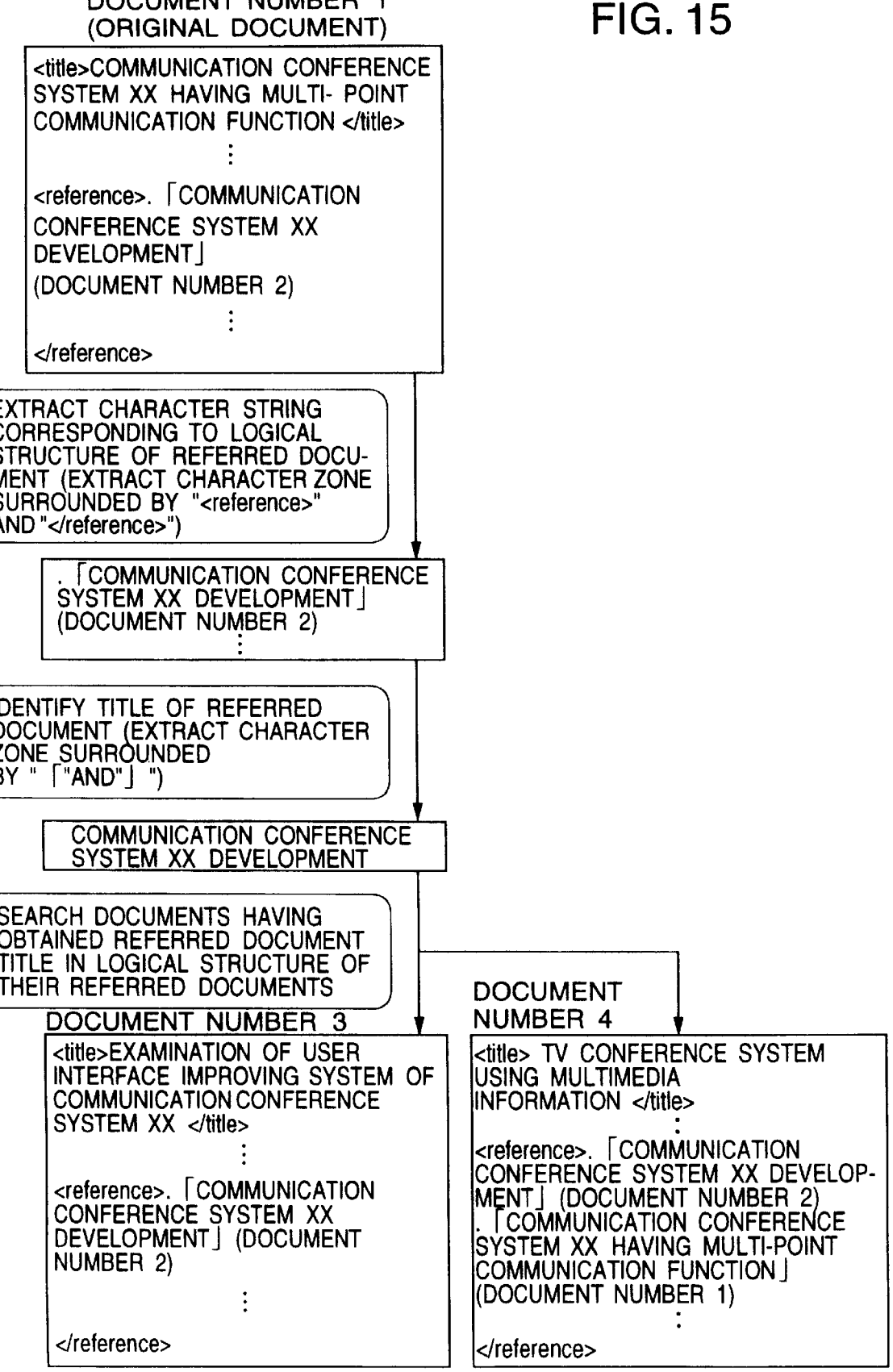
FIG. 15 is a flowchart showing an example of the searching operation in the second embodiment of the present invention.

First, in a step 4000, the related document search control program 30 activates the referred document identification program 210 to identify the title of a referred document cited in a document specified by a user. More in detail, in FIG. 15, the program 210 extracts a character zone surrounded by the start tag "<reference>" and the end tag "</reference>" and corresponding to the logical structure of the referred document from the document (having a document number 1) specified by the user to thereby cut out a character string corresponding to the logical structure of the referred document. Further, the program 210 cuts out a character string surrounded by "[" and "]" in the cut-out character string to thereby identify the title of the referred document cited in the user-specified document. In the example of FIG. 15, for instance, the program 210 identifies "Communication Conference System XX Development" as the title of the referred document.

The related document search control program 30 then executes the structure designation/search program 220 in a step 4010 to search the documents contained in the logical structure of the referred document for the title of the referred document cited in the user-specified document as related documents. In the example of FIG. 15, for instance, the structure designation/search program 220 can search the logical structure of the referred document for documents containing a character string of "Communication Conference System XXX Development" to search the documents having the document numbers 3 and 4 as the related documents.

In this way, the second embodiment of the present invention extracts a referred document cited in a document specified by the user in the search mode and extracts documents containing the title of the obtained referred document in the logical structure of the referred document, whereby the need for the registrant to previously designate or specify the document name cited in the document to be registered can be eliminated, leading to remarkable simplification of the operation of the registration mode.

Although such a method as disclosed in U.S. patent application Ser. No. 08/495232 (JP-A-6-308201) has been employed as the method of executing the searching operation specifying the logical structure of the document in the present embodiment, another method may be used if necessary. Further, though the above explanation has been made in connection with the case where the documents described in the SGML format are used as structured documents, documents described in another format such as ODA (office document architecture) format may be used as necessary.

Further, in the second embodiment of the present invention, the system is arranged to extract the character zone surrounded by the start tag "<reference>" and the end tag "</reference>" indicative of the logical structure of the referred document with respect to the SGML structured documents to cut out the character string corresponding to the referred document. However, the present invention may be arranged to extract a featured character string indicative of the logical structure of the referred document from documents, whereby the similar operation can be carried out even over general documents other than the structured documents. For example, in FIG. 3, when attention is paid to a character string "reference literature" as a chapter title indicative of reference literature, the present invention can identify a character string appearing subsequent to "reference literature" as a character string corresponding to the logical structure of a referred document. In the present method, the data creation/registration program 200 for the structure designation and search extracts the character string appearing subsequent to "reference literature" from the registration documents, and creates data for searching of the character string. The program 200 then stores the created data in the data storage region 230.

Further, the referred document identification program 210 extracts the character strings appearing subsequent to "reference literature" from the document specified by the user to thereby cut out the character string corresponding to the logical structure of the referred document. The program 210 further cuts out a character string surrounded by "⌈" and "⌋" from the cut-out character string to identify the title of the referred document cited in the user-specified document. Further, the structure designation/search program 220 searches the searching data created by the referred document identification program 210 for the title of the referred document cited in the user-specified document to search the related documents.

As mentioned above, the present invention can carry out a similar operation even over general documents other than the structured documents by extracting the featured character string indicative of the logical structure of the referred document from the documents.

Although the foregoing embodiment extracts the document cited as the reference literature from the user-specified document and searches for documents having the same document as the extracted document as their reference literature in the search mode to search for the latest related document, it will be appreciated that the document management system of the present invention having a function of sorting documents can execute a similar operation to the above in a document sort mode to extract related documents, and can classify the documents according to their categories on the basis of the extracted result. Further, the present invention can be applied even to a system called 'internet robot' which automatically collects and stores documents belonging to specified classifications in a document information system of a wide area network (WAN) type utilizing the internet, such as the world wide web (WWW).

As has been explained in the foregoing, in accordance with the present invention, the document searching method searches for other documents which refer to the same document as in the document specified by the user as their reference literature. Therefore, the present invention method can realize the searching operation of the latest related document, which has been impossible in the prior art related-document searching method.

In accordance with the present invention, since the method of the invention searches for other documents which refer to the same document as in the document specified by the user as their reference literature, the system can realize the searching operation of the latest related document, which has been impossible in the prior art related-document searching method.

What is claimed is:

1. A computer-implemented document searching method for searching a plurality of documents registered in a computer system for a desired one thereof, comprising the steps of:
    searching a first link information table, which links said plurality of registered documents to referred documents cited in the plurality of registered documents, for a referred document cited in a specified one of said plurality of registered documents; and
    searching a second link information table, which links together those of said plurality of registered documents that cite a referred document in common with each other, for any of the registered documents that cite the searched referred document cited in the specified one of said plurality of registered documents.

2. A document searching method as set forth in claim 1, wherein said first and second link information tables are recorded in a recording means that also stores said registered documents.

3. A computer-implemented document registering method for registering documents in a document database in a computer system, comprising the steps of:
    creating a first link information table linking registered documents to referred documents cited in said registered documents by extracting titles of said referred documents from the registered documents;
    creating a second link information table linking together those of said registered documents that cite a referred document in common with each other, by exchanging entries of said first link information table and sorting the exchanged first link information table for referred documents; and
    registering said first and second link information tables.

4. A document registering method as set forth in claim 3, wherein said first and second link information tables are recorded in a recording means that also stores said registered documents.

5. A computer-implemented document searching method for searching a plurality of documents registered in a document database in a computer system, comprising:
    a referred document identification step of extracting a character string corresponding to a logical structure of a referred document from a document specified by a searcher, to identify a title of the referred document from said character string; and
    a document search step of searching said registered documents for the title obtained in said referred document identification step, with use of searching data linking said registered documents to referred documents cited in said registered documents.

6. A document searching method as set forth in claim 5, wherein said character string is previously extracted from the registered document and said searching data is created based on the extracted character string.

7. A document searching method as set forth in claim 6, wherein said registered documents have a logical structure and the character string corresponding to the logical structure of the referred document is extracted from said registered document with use of said logical structure.

8. A document searching method as set forth in claim 7, wherein said extraction of the character string corresponding to the logical structure of the referred document is carried out by extracting a featured character string from said logical structure.

9. A document database, stored in a computer-readable storage medium, for registering therein documents as text data, and searching data for searching a referred document cited in said registered documents.

10. A document database as set forth in claim 9, wherein said searching data includes a character string corresponding to a logical structure of the referred documents cited in the registered documents.

11. A computer-implemented document searching system for searching a plurality of documents previously registered in a computer system, comprising:
    record means for recording therein a first link information table, which links said registered documents to referred documents cited in the plurality of registered documents, and a second link information table, which links together those of said plurality of registered documents that cite a referred document in common with each other;
    specification means for specifying a desired one of the registered documents by a user;
    means for extracting a referred document cited in said specified registered document from said document database with use of said first link information table; and means for extracting one of said plurality of registered documents that cites said extracted referred document with use of said second link information table.

12. A computer-implemented document registering and searching method for registering and searching a plurality of documents in a computer system, comprising the steps of:

creating a first link information table linking registered documents to referred documents cited in said registered documents by extracting titles of said referred documents from the registered documents;

creating a second link information table linking together those of said registered documents that cite a referred document in common with each other, by exchanging entries of said first link information table and sorting the exchanged first link information table for referred documents;

registering said first and second link information tables;

searching said first link information table for one of said referred documents cited in a specified one of said plurality of registered documents; and searching a second link information table for any of the registered documents that cite the searched referred document cited in the specified one of said plurality of registered documents.

13. A document management method for managing a plurality of documents registered in a computer system and for searching for a related document using the computer system, comprising the steps of:

(a) when registering one or more documents in the computer system:

assigning a document number unique in the computer system to each of the registered documents;

adding a record including the assigned document number, a file name of a file storing the document, and a title of the document to a document management information table, for each of the registered documents;

extracting reference titles from the registered documents;

obtaining a document number corresponding to each of the extracted reference titles by referring to the document management information table;

adding a record including the assigned document number and the obtained document number to a referred document table, for each of the obtained document numbers; and making a related document table including records containing a first registered document number and a second registered document number, the document corresponding to the second document number referring to the document corresponding to the first document number, by exchanging item positions of the referred document table and by sorting for the first document number;

(b) when a document search is instructed by a user:

searching the referred document table to find the referred document number of the referred document indicated by the user;

searching the related document table to find a related document number referring to the searched referred document number; and outputting the searched referred document number and the searched related document number with corresponding information in the document management information table.

* * * * *